(12) United States Patent
Tarandek

(10) Patent No.: US 11,091,140 B2
(45) Date of Patent: Aug. 17, 2021

(54) HOLDING ASSEMBLY

(71) Applicant: Continental Teves AG & Co. oHG, Frankfurt (DE)

(72) Inventor: Kristijan Tarandek, Neu-Isenburg (DE)

(73) Assignee: Continental Teves AG & Co., oHG

( * ) Notice: Subject to any disclaimer, the term of this patent is extended or adjusted under 35 U.S.C. 154(b) by 1020 days.

(21) Appl. No.: 14/761,111

(22) PCT Filed: Jan. 17, 2014

(86) PCT No.: PCT/EP2014/050918
§ 371 (c)(1),
(2) Date: Jul. 15, 2015

(87) PCT Pub. No.: WO2014/114565
PCT Pub. Date: Jul. 31, 2014

(65) Prior Publication Data
US 2015/0344016 A1 Dec. 3, 2015

(30) Foreign Application Priority Data

Jan. 22, 2013 (DE) ..................... 10 2013 200 905.4
Nov. 13, 2013 (DE) ..................... 10 2013 223 087.7

(51) Int. Cl.
*B60T 17/04* (2006.01)
*B60T 11/10* (2006.01)
(Continued)

(52) U.S. Cl.
CPC .......... *B60T 17/043* (2013.01); *B60T 8/3685* (2013.01); *B60T 11/10* (2013.01); *B60T 13/567* (2013.01); *F16L 23/003* (2013.01)

(58) Field of Classification Search
CPC .... B60T 17/043; B60T 8/3685; B60T 13/567; B60T 7/06; B60T 11/10; G05G 1/30; G05G 1/323; G05G 1/46
(Continued)

(56) References Cited

U.S. PATENT DOCUMENTS 1,608,124 A * 11/1926 Johnson ................... G05G 1/46
74/513
3,714,780 A 2/1973 Shellhause
(Continued)

FOREIGN PATENT DOCUMENTS

CN 1636808 7/2005
DE 3420896 12/1985
(Continued)

OTHER PUBLICATIONS

German Search Report for German Application No. 10 2013 223 087.7 dated Dec. 2, 2013, including partial translation.
(Continued)

*Primary Examiner* — Matthew Troutman
*Assistant Examiner* — Fannie C Kee
(74) *Attorney, Agent, or Firm* — RatnerPrestia

(57) ABSTRACT

A holding assembly for securing a flange part which is provided on a braking device on an bulkhead of a motor vehicle, which bulkhead divides an engine compartment from a vehicle interior, wherein a holding plate is fastened on the side of the bulkhead facing the engine compartment and is provided with a form-locking connection that engages with the flange part.

10 Claims, 2 Drawing Sheets

(51) Int. Cl.
  *B60T 8/36* (2006.01)
  *F16L 23/00* (2006.01)
  *B60T 13/567* (2006.01)
(58) Field of Classification Search
  USPC .................................... 285/27, 142.1, 325
  See application file for complete search history.

(56) References Cited

U.S. PATENT DOCUMENTS

| | | | | |
|---|---|---|---|---|
| 3,788,709 | A * | 1/1974 | Schwerin | B60T 7/06 188/3 R |
| 4,353,291 | A * | 10/1982 | Hauduc | B60T 13/567 92/128 |
| 4,393,750 | A * | 7/1983 | Wagner | B60T 13/567 91/369.2 |
| 4,441,380 | A * | 4/1984 | Kawaguchi | B60T 7/045 74/512 |
| 4,450,688 | A * | 5/1984 | Boehm | B60T 13/567 60/547.1 |
| 4,455,829 | A * | 6/1984 | Seip | B60T 13/567 60/547.1 |
| 4,492,081 | A * | 1/1985 | Weiler | B60T 13/567 60/547.1 |
| 4,547,003 | A * | 10/1985 | McGugan | E21B 17/085 285/27 |
| 4,658,660 | A | 4/1987 | Parker | |
| 4,779,516 | A * | 10/1988 | Parker | B60T 13/567 24/DIG. 53 |
| 4,784,046 | A | 11/1988 | Gautier | |
| 4,798,129 | A | 1/1989 | Staub, Jr. | |
| 4,958,607 | A * | 9/1990 | Lundberg | B60K 26/02 123/399 |
| 5,184,468 | A * | 2/1993 | Schonlau | B60T 7/04 60/535 |
| 5,487,324 | A * | 1/1996 | Gautier | B60T 13/52 91/369.1 |
| 5,487,327 | A * | 1/1996 | Schluter | B60T 13/565 92/128 |
| 5,685,150 | A | 11/1997 | Hinz | |
| 5,974,944 | A * | 11/1999 | Gautier | B60T 13/567 91/369.2 |
| 6,000,516 | A | 12/1999 | Teichert | |
| 6,301,886 | B1 * | 10/2001 | Kaneko | B60T 13/565 60/547.1 |
| 6,322,284 | B1 | 11/2001 | Bonardo | |
| 6,363,811 | B1 * | 4/2002 | Saldana | G05G 1/30 74/505 |
| 7,082,870 | B2 | 8/2006 | Verbo | |
| 2004/0160119 | A1 * | 8/2004 | Wagner | B60T 7/042 303/114.3 |
| 2005/0139062 | A1 * | 6/2005 | Verbo | B60T 13/567 91/376 R |
| 2012/0324881 | A1 * | 12/2012 | Kim | B60T 13/565 60/533 |

FOREIGN PATENT DOCUMENTS

| | | | |
|---|---|---|---|
| DE | 4403466 | 8/1995 | |
| DE | 10134569 A1 * | 2/2003 | ............... G05G 1/30 |
| DE | 19710631 | 2/2006 | |
| DE | 102009032348 | 2/2010 | |
| DE | 102010052589 | 6/2011 | |
| EP | 0262006 | 3/1988 | |
| EP | 1547890 | 6/2005 | |
| FR | 2781259 | 1/2000 | |
| FR | 2843575 | 2/2004 | |
| FR | 2920380 | 3/2009 | |
| FR | 2925444 | 6/2009 | |

OTHER PUBLICATIONS

International Search Report for International Application No. PCT/EP2014/050918 dated May 9, 2014.
Chinese Office Action for Chinese Application No. 201480005488.5, dated Nov. 3, 2016, including English translation, 13 pages.
Korean Office Action for Korean Application No. 10-2015-7021981, dated Nov. 12, 2019 with translation, 16 pages.

* cited by examiner

HOLDING ASSEMBLY

CROSS REFERENCE TO RELATED APPLICATIONS

This application is the U.S. National Phase Application of PCT International Application No. PCT/EP2014/050918, filed Jan. 17, 2014, which claims priority to German Patent Application No. 10 2013 200 905.4, filed Jan. 22, 2013 and German Patent Application No. 10 2013 223 087.7 filed Nov. 13, 2013, the contents of such applications being incorporated by reference herein.

FIELD OF THE INVENTION

The invention relates to a holding assembly for fixing a flange part, which is fastened to a braking device, to a bulkhead of a motor vehicle.

BACKGROUND OF THE INVENTION

A holding assembly for fixing a flange part, which is provided on a braking device, to a bulkhead of a motor vehicle, said bulkhead separating the engine compartment from a vehicle interior, is disclosed by way of example in DE 44 03 466 A1, which is incorporated by reference. The holding assembly has two studs which have to be inserted from the flange part of the braking device through the bulkhead into the vehicle interior and screwed from the vehicle interior. The cost to install and remove the braking device again, therefore, is considerable due to the poor accessibility of the bulkhead in the vehicle interior. Moreover, the braking device has to be simultaneously supported in the engine compartment in order to prevent it from tilting and falling out.

SUMMARY OF THE INVENTION

An aspect of the invention is to improve a holding assembly of the aforementioned type so that at the lowest possible structural and functional cost a particularly simple and rapid mounting of the braking device on the bulkhead is ensured, wherein the supply, alignment and fastening of the braking device is intended to be carried out by simple means exclusively on the side of the bulkhead facing the engine compartment.

BRIEF DESCRIPTION OF THE DRAWINGS

Further features of the invention may be derived from the individual claims and from the description of an exemplary embodiment with reference to several drawings, in which:

DETAILED DESCRIPTION OF THE PREFERRED EMBODIMENTS

Figures 1A, 1B:
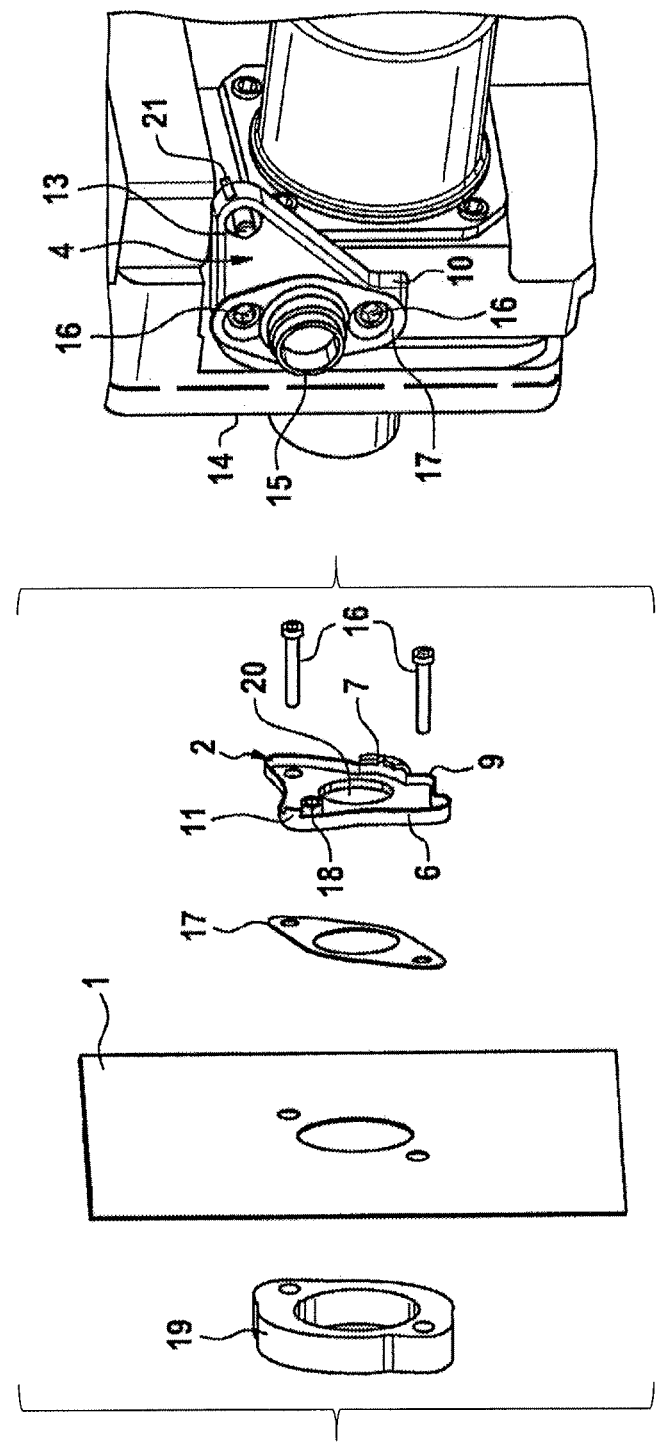
FIGS. 1A and 1B show an exploded view and a perspective overall view of a holding assembly provided with the features essential to the invention before the mounting of a braking device on a bulkhead.

FIGS. 1A and 1B show in an exploded view and a perspective view the details of a holding assembly for fixing a flange part 4, which is provided on a braking device 14, to a bulkhead 1 of a motor vehicle, said bulkhead separating an engine compartment from a vehicle interior. According to the illustration, a holding plate 2 is fastened to the side of the bulkhead 1 facing the engine compartment, said holding plate having elements of a positive connection 3 which is brought into engagement with the flange part 4 which is fastened to the braking device 14 by two screws 16. The holding plate 2 is also fastened to the bulkhead 1 by means of two diametrically arranged holding screws 16, a pedal support 19 being arranged on the bulkhead 1 inside the vehicle interior and the two screws 16 being screwed from the engine compartment side into said pedal support. In each case, a seal 17 is arranged between the holding plate 2 and the bulkhead 1 and between the holding plate 2 and the flange part 4 for protection against the penetration of moisture and dirt.

Figure 2:
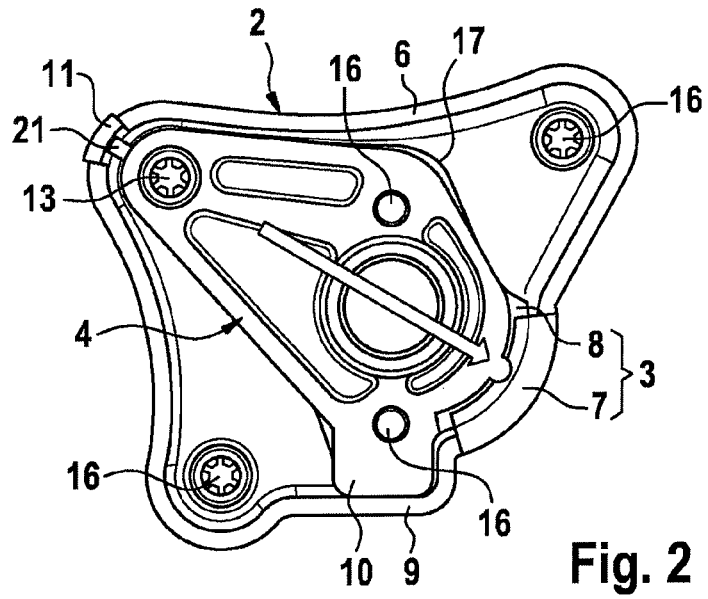
FIG. 2 shows a plan view of the holding assembly after the final mounting is completed.

As may be seen clearly from FIG. 2 in a plan view of the entire holding assembly, further elements of a non-positive connection 5 are arranged on the holding assembly diametrically to the elements of the positive connection 3, so that in the present view the flange part 4 is in a final fixed engagement with the holding plate 2.

For improved understanding of the features which are essential to the invention, the view of the braking device 14 fixedly connected to the flange part 4 has been dispensed with in the selected plan view. Due to the freely accessible mounting required for the two holding screws 16 and the final fixing screw 13, the outer periphery of the holding plate 2 is shaped asymmetrically, in each case in the manner of a tab extending radially outwardly in the region of each screw receiver, and defined by a peripheral frame 6, wherein the frame 6 which is produced cost-effectively by plastic deformation of the holding plate 2 is plastically deformed to form a hook 7, to form the positive connection 3, a radial projection 8 formed on the outer periphery of the asymmetrically shaped flange part 4 being in engagement with said hook.

For accurate alignment and reception of the flange part 4 on the holding plate 2, the frame 6 also has a supporting edge 9 which, after inserting the flange part 4 into the frame 6 (according to the direction of the arrow), is brought into contact with a further projection 10 provided on the outer periphery of the flange part 4, which thus guides the flange part 4 accurately on the holding plate 2 via the further projection 10. The supporting edge 9 is provided below the hook 7 approximately on the lowest point of the frame 6, so that for easy mounting of the braking device 14 on the bulkhead 1, the flange part 4 premounted on the braking device 14 comes to bear with its tongue-shaped projection 10 against the supporting edge 9 of the frame 6, as soon as the flange part 4 above the projection 10 is tilted behind the hook 7 with its projection 8 facing the hook 7.

A funnel-shaped and widened stop surface 11 is provided on the portion of the frame 6 aligned diametrically to the hook 7, the plate-shaped flange part 4 bearing thereagainst with its wedge 21 formed on the outer surface, after the projection 8 of the flange part 4 is in positive engagement with the hook 7, wherein for producing the non-positive connection 5 the flange part 4 is pressed against the holding plate 2 by radial pretensioning of the final fixing screw 13.

As an essential element of the non-positive connection 5 an internal thread 12 is provided in a diametrical arrangement with the hook 7 in the holding plate 2, the final fixing screw 13 which passes through the flange part 4 being screwed into the internal thread as a further element of the non-positive connection 5, from the direction of the engine compartment/braking device 14.

Figure 3:
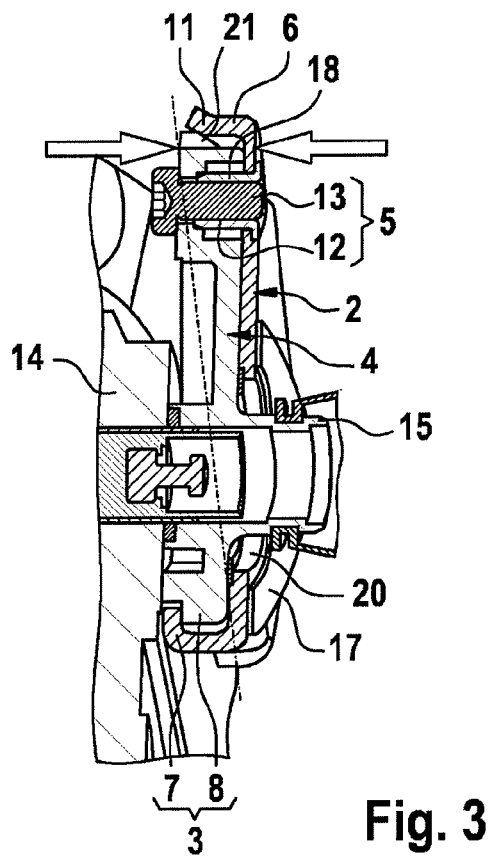
FIG. 3 shows a sectional view through the holding assembly mounted on the bulkhead, not shown, which carries the braking device.

In FIG. 3, the fully completed holding assembly is illustrated in longitudinal section, according to which the internal thread 12 is received in a sleeve 18 arranged vertically on the holding plate 2, said sleeve bearing with its collar against the holding plate 2 and with the sleeve end remote therefrom partially extending into a through-bore of the flange part 4. By means of the sleeve 18, in combination with the supporting edge 9 provided on the holding plate 2, the flange part 4 is accurately aligned with the braking device 14 on the holding plate 2, so that the relatively short final fixing screw 13 may be screwed into the internal thread 12 in an easily accessible manner between the braking device 14 and the flange part 4.

As the illustration according to FIG. 3 shows, the flange part 4 is designed as a solid plate adapted to the internal contour of the holding plate 2, said solid plate having a tubular extension 15 which extends into the vehicle interior through a generously dimensioned opening 20 in the holding plate 2, for passing through a pedal rod.

The holding plate 2 is preferably produced by being stamped from sheet steel which at the same time provides good characteristics for stamping the opening 20, the opening required for the internal thread 12 and the sleeve 18 and for the two further holes in the holding plate 2 required for the holding screws 16. The frame 6 and the specific design of the frame required for the positive connection 3 relative to the hook 7 are produced on the holding plate 2 in a simple and thus cost-effective manner, preferably by compression molding and/or deep drawing.

In contrast, the flange part 4 in combination with the radial projection 8 required for forming the positive connection 3 is preferably cost-effectively produced as a die-cast part from a light metal alloy or optionally by injection-molding a fiber-reinforced plastics material.

According to the features of the invention cited above, therefore, a holding assembly is provided, said holding assembly permitting a simple and rapid mounting and dismantling of the braking device 14 on the bulkhead 1 exclusively from the engine compartment side, wherein the mounting of the braking device 14 is carried out in the shortest time, by suspending the projection 8 provided on the flange part 4 in the hook 7 of the holding plate 2 and subsequently tightly screwing the flange part 4 to the holding plate 2 by means of the final fixing screw 13.

LIST OF REFERENCE NUMERALS

1 Bulkhead
2 Holding plate
3 Positive connection
4 Flange part
5 Non-positive connection
6 Frame
7 Hook
8 Projection
9 Supporting edge
10 Projection
11 Stop surface
12 Thread
13 Final fixing screw
14 Braking device
15 Extension
16 Holding screw
17 Seal
18 Sleeve
19 Pedal support
20 Opening
21 Wedge

The invention claimed is:

1. A holding assembly for fixing a flange part, which is provided on a braking device, to a bulkhead of a motor vehicle, said bulkhead separating an engine compartment from a vehicle interior, the holding assembly comprising:
a holding plate formed as a one-piece component and configured to be fastened to a side of the bulkhead facing in an axial direction toward the engine compartment, the holding plate being fastened to the bulkhead by two diametrically arranged holding screws, said holding plate having:
a hook comprising a first axial surface and a second axial surface axially spaced from the first axial surface in the axial direction configured to engage a portion of the flange part in the axial space therebetween such that the first and second axial surfaces delimit movement of the portion of the flange part in the axial direction, and
an internal thread provided in the holding plate diametrically opposed to the hook, said internal thread configured to receive a screw extending in the axial direction and passing through the flange part in the axial direction.

2. The holding assembly as claimed in claim 1 wherein an outer periphery of the holding plate is defined at least partially by a peripheral frame, and the portion of the flange part comprises a radial projection provided on an outer periphery of the flange part.

3. The holding assembly as claimed in claim 2, wherein for accurate alignment of the flange part on the holding plate, the frame has a supporting edge which is brought into contact with a further projection provided on the outer periphery of the flange part.

4. The holding assembly as claimed in claim 3, wherein the supporting edge is provided below the hook.

5. The holding assembly as claimed in claim 2, wherein a funnel-shaped and widened stop surface is provided on a portion of the frame aligned diametrically to the hook, the flange part bearing against said stop surface with an outer surface of the flange part having a partially wedge-shaped configuration being under radial pretensioning.

6. The holding assembly as claimed in claim 1, wherein the screw passing through the flange part is screwed into said internal thread from a direction of the braking device.

7. The holding assembly as claimed in claim 6, wherein the internal thread is received in a sleeve fixed to the holding plate, said sleeve partially extending in a through-bore of the flange part, wherein by means of the sleeve, the hook and a supporting edge on the holding plate, the flange part is accurately aligned on the holding plate with the braking device fastened to said flange part.

8. The holding assembly as claimed in claim 1, wherein the flange part is a plate which is partially adapted to a contour of the holding plate and which is provided for passing through a pedal rod with a tubular extension which extends through an opening in the holding plate.

9. The holding assembly as claimed in claim 1, wherein the flange part is fastened to the braking device by two diametrically arranged holding screws.

10. The holding assembly as claimed in claim 1, wherein a seal is arranged between the holding plate and the bulkhead and between the holding plate and the flange part.

* * * * *